(12) United States Patent
Fortmann et al.

(10) Patent No.: US 7,989,974 B2
(45) Date of Patent: Aug. 2, 2011

(54) POWER CONTROL OF A WIND PARK

(75) Inventors: Jens Fortmann, Berlin (DE); Jens Altemark, Rendsburg (DE); Jörg Zeumer, Rendsburg (DE)

(73) Assignee: REpower Systems AG, Hamburg (DE)

( * ) Notice: Subject to any disclaimer, the term of this patent is extended or adjusted under 35 U.S.C. 154(b) by 608 days.

(21) Appl. No.: 11/995,309

(22) PCT Filed: Jul. 12, 2006

(86) PCT No.: PCT/JP2006/006821
§ 371 (c)(1),
(2), (4) Date: Jan. 10, 2008

(87) PCT Pub. No.: WO2007/006565
PCT Pub. Date: Jan. 18, 2007

(65) Prior Publication Data
US 2008/0265577 A1 Oct. 30, 2008

(30) Foreign Application Priority Data

Jul. 13, 2005 (DE) .......................... 10 2005 032 693

(51) Int. Cl.
*H02P 9/04* (2006.01)
(52) U.S. Cl. ........................................... 290/44; 307/47
(58) Field of Classification Search .................... 290/44, 290/55; 307/47, 87
See application file for complete search history.

(56) References Cited

U.S. PATENT DOCUMENTS

| 7,015,595 B2 * | 3/2006 | Feddersen et al. ............... 290/44 |
| 7,166,928 B2 * | 1/2007 | Larsen .............................. 290/55 |
| 7,346,462 B2 * | 3/2008 | Delmerico ....................... 702/60 |
| 7,603,202 B2 * | 10/2009 | Weitkamp ..................... 700/287 |
| 7,606,638 B2 * | 10/2009 | Fortmann et al. ............. 700/287 |
| 7,741,728 B2 * | 6/2010 | Fortmann et al. ................ 290/44 |
| 7,755,209 B2 * | 7/2010 | Jones et al. ....................... 290/44 |
| 2008/0088129 A1 * | 4/2008 | Altemark et al. ................ 290/44 |

FOREIGN PATENT DOCUMENTS

| EP | 0 877 475 A1 | 11/1998 |
| EP | 1 519 040 A | 3/2005 |
| WO | WO-01/25630 A | 4/2001 |
| WO | WO-02/086314 A | 10/2002 |
| WO | WO-03/030329 A | 4/2003 |

* cited by examiner

*Primary Examiner* — Michael C Zarroli
(74) *Attorney, Agent, or Firm* — Morrison & Foerster LLP (57) ABSTRACT

A method for regulating a wind energy installation including a rotor-driven generator, a converter connected to the generator, and a controller that regulates power emitted into an energy transmission system to within a limit value involves determining a maximum current value in a connection path, determining a current reserve value for power emitted into an energy transmission system, and determining a correction value for following a limit value of the emitted power from the maximum current value and the current reserve value. The wind energy installation and the method for its regulation also includes the use of a limitation device configured to set a phase angle between an emitted current and voltage of an electrical system in response to a selection signal in such a way that primarily active power or primarily reactive power is fed into the energy transmission system when the maximum current value is reached.

17 Claims, 4 Drawing Sheets

Fig. 5 ing the energy transmission system by a greater reactive power feed.

POWER CONTROL OF A WIND PARK

REFERENCE TO RELATED APPLICATIONS

This application is a national stage application under 35 USC 371 of International Application No. PCT/EP2006/006821, filed Jul. 12, 2006, which claims the priority of German Application No. 10 2005 032 693.5, filed Jul. 13, 2005, the contents of both of which are incorporated herein by reference.

FIELD OF THE INVENTION

The invention relates to a method for regulating a wind energy installation having a generator driven by a rotor, a converter connected to said generator, and a controller with a power regulation module regulating the power emitted via a connection path into an energy transmission system, or to a method of regulating a wind farm. The invention also relates to a wind energy installation or wind farm operated in accordance with this method.

BACKGROUND OF THE INVENTION

In order to generate electrical energy by means of wind energy on a relatively large scale, wind energy installations with ever higher outputs are produced. Often, a plurality of wind energy installations erected at one location are combined to form a wind farm. However, it is the case that it is precisely the locations with severe winds and which are suitable for erecting wind energy installations or wind farms with a high output are located in rural, sparsely populated areas. In these areas, the energy transmission system of the energy providers generally only has a low transmission power. It is not rare for this to result in corresponding restrictions applying to the operation as a result of the restricted transmission capacity of the energy transmission system. The operational limits of an energy transmission system are determined by power limits of the lines and components connected therebetween such as transformers. The operational limits of the energy transmission system necessitate a limitation which prevents it from being possible to utilize the full power of the wind energy installation or of the wind farm in favorable wind conditions. This results in economic disadvantages.

SUMMARY OF THE INVENTION

The invention is based on the object of providing a wind energy installation or a wind farm and a method for operation thereof which allows for improved utilization.

Various embodiments, aspects and modes of the invention will be described as follows. In a method for regulating a wind energy installation, which has a generator, which is driven by a rotor, and a converter, which is connected to said generator, as well as a controller, the controller regulating the power emitted via a connection path into an energy transmission system by a power regulation module and having devices for measuring the fed power, a maximum current of the connection path is determined, a current reserve remaining in the case of the power emitted into the system up to the maximum current is determined, and a correction value for adjusting the emitted power is determined.

The invention involves the concept of always fully utilizing the available capacity of the connection path for connection to the energy transmission system, to be precise as far as possible independently of the respective operating state. It is based on the knowledge that the operational limits of many components used for the system connection to the energy transmission system, such as cables or transformers, are determined by their respective thermal limits. In order to ensure operational reliability, the power loss produced in the individual components should not exceed a respective critical value even under unfavorable conditions. When determining the critical value, care should be taken to ensure that the voltage in a system is not a constant, but has a considerable variation range. Thus, the voltage in the high-voltage system can deviate from the rated voltage by +10%/−13% in accordance with relevant guidelines of the Association of system operators [Verband der Netzbetreiber] (Transmission Code 2003). In order in any case to ensure the operational reliability, the system is conventionally designed for the most unfavorable point in the range. On this basis, the permissible feed power is calculated, possibly whilst taking into consideration additional reactive power production or incoming supply. The invention has identified that using this method of calculation the components are not fully utilized. On the basis of the known formula for the power loss produced in a component with a complex impedance $P_v = I_N \times I_N / \text{real}(Z_L)$, the knowledge results that the highest possible power loss occurs when the lowest permissible voltage occurs in the energy transmission system (in accordance with the known relationship $P = U \times I$). Then, the greatest current (maximum current) is flowing. The invention has identified that given any other, higher voltage value the power loss in fact resulting in the component is lower as a result of the then lower current value. If the voltage is, for example, precisely at the rated value, the maximum current is no longer flowing, but a reduced current in accordance with the relationship $P = U \times I$ is flowing. Its absolute value is inversely proportional to the voltage. This results in a difference between the actually flowing current in the region of the rated working point and the calculated maximum current. There is therefore a current reserve. The invention uses this current reserve for increasing the power actually transmitted into the energy transmission system. The gain that can be achieved depends on the actually present system voltage in relation to the lowest permissible voltage. If, as explained above, the permissible voltage deviations from the rated voltage are +10 and −13%, given an actual voltage in the energy transmission system at the same level as the rated voltage a current reserve of 13% results. As a result of the utilization of this current reserve in accordance with the invention, the transmitted power can be increased by 13% without this therefore resulting in overloading of the component. If the actual voltage is above the rated voltage at the upper permissible value, the current reserve is even 23%. It is therefore made possible in accordance with the invention even to transmit almost ¼ more power into the energy transmission system without the permissible power losses being exceeded. With such an increase in the possible transmission power, the utilization of the wind farm can be considerably improved. The efficiency of operation is therefore also increased.

Expediently, a limitation device is provided which, when the maximum current is reached, sets a phase angle between the current emitted into the energy transmission system and the system voltage as a function of a selection signal. The total absolute value for the current in this case remains fixed, namely at the level of the maximum current, and the angle between the current and the voltage is changed. It is thus possible to predetermine by the selection signal whether primarily active power or primarily reactive power is to be fed into the system. The selection signal can therefore be used to select whether preference is intended to be given to a higher yield by a greater active power feed or to voltage stabilizing of this system as a result of a greater reactive power feed. Expediently, the selection signal is generated by a voltage droop. It makes it possible to determine the reactive power requirement necessary for stabilizing the system. On this basis, it is then possible to decide whether the active or the reactive power production should be given priority. Alternatively or in addition, however, provision may also be made for the selection signal to be supplied from the outside, in particular by the system operator. This makes it possible for the system operator to decide, as a function of the state of the energy transmission system, whether more active power or more reactive power is required and should be fed.

As a function of the respectively required active or reactive power, the respective other parameter, i.e. reactive or active power, can be determined by using a predeterminable characteristic. For this purpose, a characteristic module can be provided which is integrated, for example, in the voltage droop. It is designed to determine, as a function of one variable, for example the active power, the other variable, for example the reactive power, using the input characteristic. The characteristic is freely selectable per se. Preferably, this characteristic is an elliptical function, which is expediently standardized to the maximum power, as follows: $1=P^2:a^2+Q^2:b^2$. By selecting the coefficients a, b preference can be given to the active or reactive power feed.

Expediently, an additional current for compensating for line capacitances is determined and additionally fed. This current can be determined independently of the system voltage and of the current limitation or the active current feed at that time. Preferably, this takes place according to the formula $iq=U/Z=U \times jwc$. This current is used for compensating for the capacitive load on the wind energy installation side of the connection path and therefore remains without any influence on the current limitation towards the system. The compensation for this capacitive load is important in particular when a plurality of wind energy installations are connected together so as to form a wind farm.

Expediently, a limitation signal is applied to the wind energy installation for limiting the current emitted by it. It can be, for example, in the range of from 0 to 100% of the permissible current. There is therefore direct intervention at the source of the electrical power, to be precise in particular in relation to the active current component. Expediently, when determining the limitation signal, the complex impedance of the line to the wind energy installation is also included.

In addition, the invention relates to a method for regulating a wind farm with a wind farm master and at least one wind energy installation having the features of described above.

Expediently, different correction values are determined for the individual wind energy installations. To be precise, the correction value can also be predetermined so as to be the same for all wind energy installations in a wind farm, but it is generally more favorable to predetermine the respective components of active power and reactive power to be different between the various wind energy installations. Thus, losses can be reduced and greater utilization can be achieved.

Furthermore, it is expedient to determine and apply individual limitation signals for the wind energy installations. It is thus also possible to perform optimization of the entire wind farm power by higher limit values being predetermined in particularly high-power wind energy installations than in low-power installations of the wind farm. In this case, high-power and low-power relate not only to the structural configuration of the individual wind energy installations but also include location-dependent parameters, such as particularly favorable position with respect to the wind, etc.

Furthermore, the invention relates to a wind energy installation and to a wind farm for carrying out the abovementioned method.

BRIEF DESCRIPTION OF THE DRAWINGS

The invention will be explained below with reference to the drawing, in which advantageous exemplary embodiments are illustrated and in which.

DETAILED DESCRIPTION OF THE INVENTION

Figure 1:
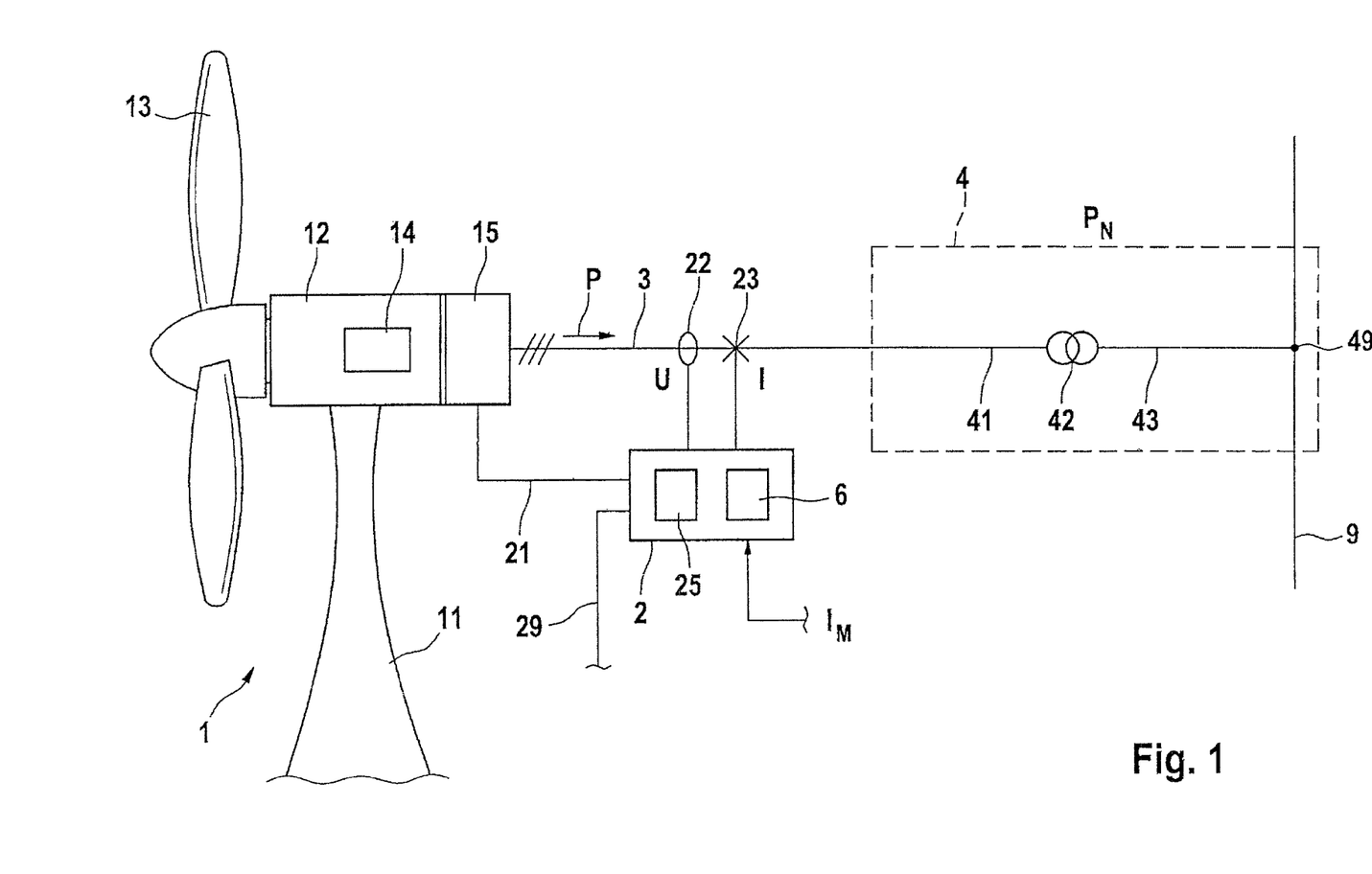
FIG. 1 shows a schematic view of a wind energy installation in accordance with a first exemplary embodiment of the invention.

The wind energy installation illustrated in FIG. 1 is a basic design for a conventional wind energy installation with variable speed. The wind energy installation 1 comprises a tower 11 with a machine house 12 arranged on it. A rotor 13 is mounted rotatably on one of its end sides and is connected to a generator 14 via a drive shaft (not illustrated). The generator 14 is preferably a double-fed asynchronous machine, but other designs such as synchronous machines, asynchronous machines or permanent-magnet machines can also be used. The generator 14 is electrically connected to a converter 15 and further to a line 3. The converter 15 can be designed and connected in the form of a full converter or in the form of a partial converter. For control purposes, a controller 2 is provided on the wind energy installation 1. It is illustrated as being set back from the wind energy installation 1 for reasons of clarity, but is in fact generally provided physically on the wind energy installation 1 itself, often even arranged in the machine house 12. The controller 2 is designed to operate the wind energy installation 1 in accordance with a default setting which can be set. The default settings can be established internally or supplied from the outside via a connection 29. This connection 29 is often in the form of a data connection by a modem, with the result that access via a telephone network or data network or else wireless data transmission is made possible. The control device 2 is provided with measuring devices, of which a voltage measuring device 22 and a current measuring device 23 in the line 3 are illustrated by way of example. These measuring devices are used for determining the power emitted by the wind energy installation 1 into the line 3 and for correspondingly regulating the wind energy installation 1. Further measuring devices can be provided, but are not illustrated for reasons of clarity.

The electrical power emitted by the wind energy installation 1 into the line 3 is transmitted via a connection path 4 into an energy transmission system 9. The connection path 4 is used for connecting the wind energy installation 1 to the energy transmission system 9. Depending on the location of the wind energy installation 1 in relation to the energy transmission system 9, the connection path 4 may cover a considerable distance. Distances of over several kilometers are not rare in this case. In the case of offshore installations, the distances may be up to 100 km, and in this case parallel connection paths are often provided for reasons of safety. The connection path 4 illustrated comprises a medium-voltage line 41, a transformer 42 and a high-voltage line 43 and a node 49 with the energy transmission system 9. In the exemplary embodiment illustrated, the energy transmission system 9 is a high-voltage system. If the connection to a medium-voltage or low-voltage system is provided, the transformer 42 can be dispensed with.

The controller 2 of the wind energy installation 1 has a power regulation module 25. It is designed to operate the wind energy installation in accordance with internal default settings and/or default settings which are applied externally by the operator of the energy transmission system 9 via the connection 29. For this purpose, the power regulation module 25 acts on the converter 15, possibly also on the rotor 13. The measuring devices 22, 23 are used for measuring the power emitted by the wind energy installation 1 into the line 3. These measuring devices can be used to determine the total electrical power emitted, the active power component and the reactive power component. Specific default settings with respect to the active power and reactive power to be emitted can therefore also be satisfied.

Figure 2:
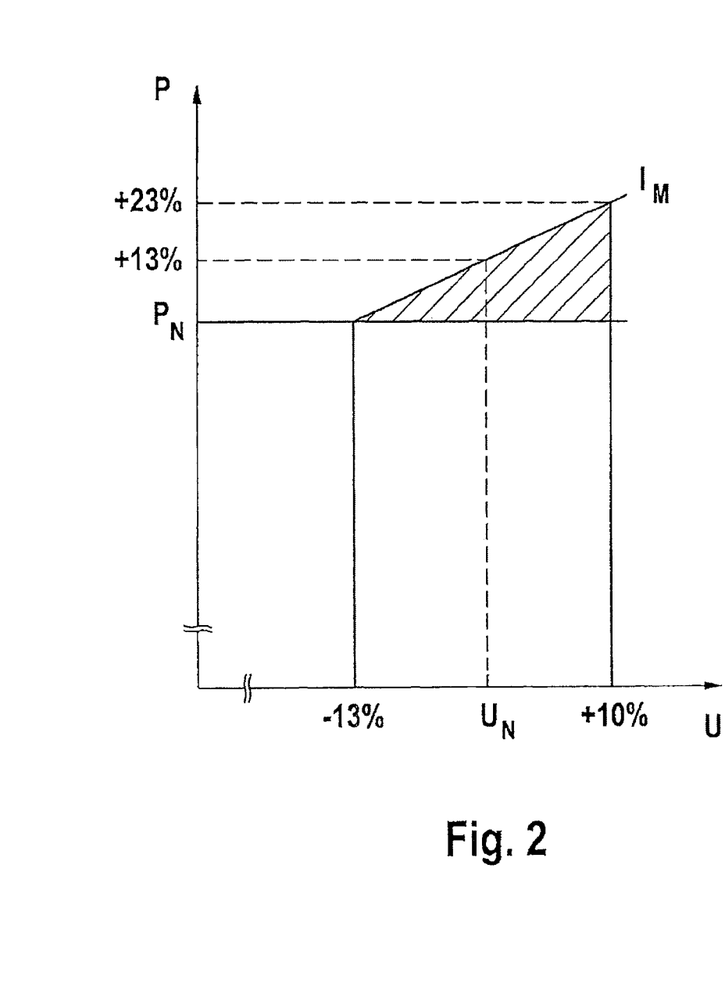
FIG. 2 shows a power graph of the power fed by the wind energy installation shown in FIG. 1 over voltage.

The transmission path 4 is designed for a specific rated power $P_N$. This rated power can be determined by the maximum power which can be emitted into the energy transmission system at the node 49, but it can also be determined by the dimensions of the individual components of the connection path 4, such as lines or transformers. This rated power ensures that, whilst adhering to the standard conditions for the voltage in the energy transmission system 9, no overload occurs. The invention now makes use of the fact that the power limitation of these components is generally determined from the thermal loading by power loss. In order to ensure safe operation, the power loss should not exceed a specific critical value even under unfavorable conditions. In this case, the fact that the voltage in the system 9 is not constant should be taken into consideration. As can be seen from FIG. 2, there is a tolerance range around the rated voltage. In the case of high-voltage systems, it is +10 and −13% of the rated voltage, for example in accordance with the relevant guidelines of the Association of system operators VDN (Transmission Code 2003). In this range, the voltage system together with its associated components must operate safely. The connection path 4 is designed correspondingly. This means that the connection path 4 must be able to transmit the rated power $P_N$ even when the voltage is at the lower end of the voltage band, i.e. for example is at 13% below the rated voltage. The maximum current to be transmitted in the process results from the relationship P=U×I as $I_N=P_N/(U_N\times0.87)$. This maximum current is 13% greater than the rated current, which results from a calculation using the formula $I_N=P_N/U_N$. This means that the connection path is designed for a current which is 13% higher than the rated current $I_N$ which results by computation with the rated power $P_N$ and rated voltage $U_N$.

If the transmission path 4 is now operated with the proviso that, in order to maintain the permissible power loss, the maximum current $I_M$ is not exceeded, a power gain which increases as the voltage increases results from the lower limit value for the system voltage. This power gain is illustrated as the hatched region in FIG. 2. If the voltage in the energy transmission system 9 is actually at the level of the rated value, a gain with respect to the rated power $P_N$ of 13% therefore results and if the actual voltage in the energy transmission system 9 reaches the upper tolerance value, a gain of 23% results. The invention makes use of the fact that in this case, despite the rated power being exceeded by almost ¼, the power loss determined by the current $I_M$ remains in the permissible range, with the result that no overloading of the transmission path 4 takes place. The invention therefore makes it possible to make considerably better use of a given transmission path 4 without any structural modifications. In order to operate the wind energy installation 1 in this operating mode whilst maintaining the maximum current $I_M$, an additional power device 6 is provided.

Figure 3:
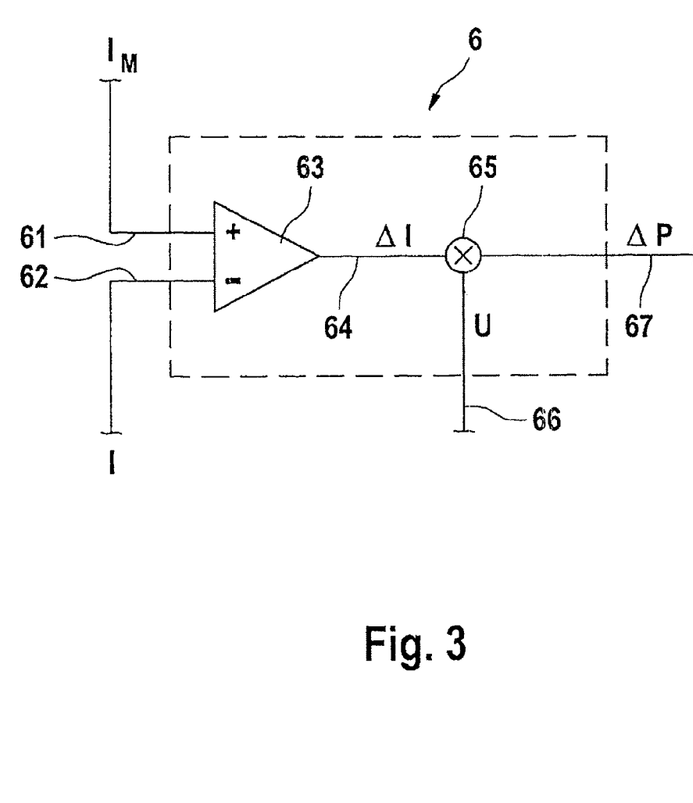
FIG. 3 shows a schematic view of a detail for determining a correction value in accordance with the first exemplary embodiment.

The additional power device 6 is illustrated in detail in terms of its schematic design in FIG. 3. It comprises a differential element 63 and a multiplication element 65 as the main component parts. An input value for the maximum current $I_M$ is connected to an input 61 of the differential element 63. This input value can be input via a manual unit, made available from a memory area by the controller 2 or externally, and can in the process also be varied in terms of time. The current which is actually flowing via the line 3 into the connection path 4 is applied to another input 62. The differential element 63 determines from this a current reserve ΔI and applies it via a connecting line 64 and the multiplication element 65. The voltage U is applied to the connecting line 3 via a connection 66 at a further connection of the multiplication element 65. A correction value ΔP for the power which can be emitted is calculated from this and output at an output 67. This output connection 67 is connected to the power regulator 25 of the control device 2. The power emitted by the wind energy installation can therefore be increased correspondingly.

Figure 4:
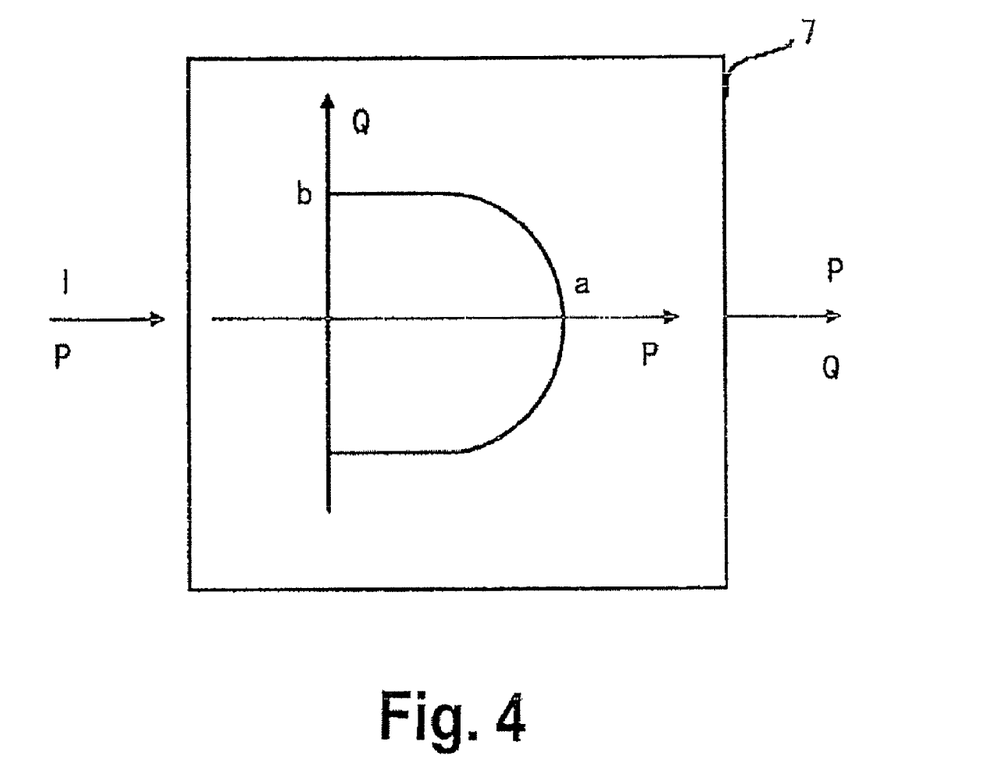
FIG. 4 shows a schematic view of a detail of a characteristic module.

FIG. 4 illustrates a characteristic module 7. It serves the purpose of determining a reactive power which can still be transmitted whilst taking into consideration the limit values, using a predeterminable value for the active power to be transmitted. For this purpose, an elliptical characteristic is implemented in the characteristic module 7. It follows the relationship $1=P^2:a^2+Q^2:b^2$, which is based on the maximum power which can be transmitted in the illustration. By the default setting for an active power component P or a phase angle ϕ, the characteristic module 7 makes it possible to use the elliptical characteristic implemented to determine the respective highest value pair for the active power P and the reactive power Q. The characteristic module 7 can be provided in the controller 2 of the wind energy installation or, in the case of a wind farm with a plurality of wind energy installations, expediently in the wind farm master 5.

Figure 5:
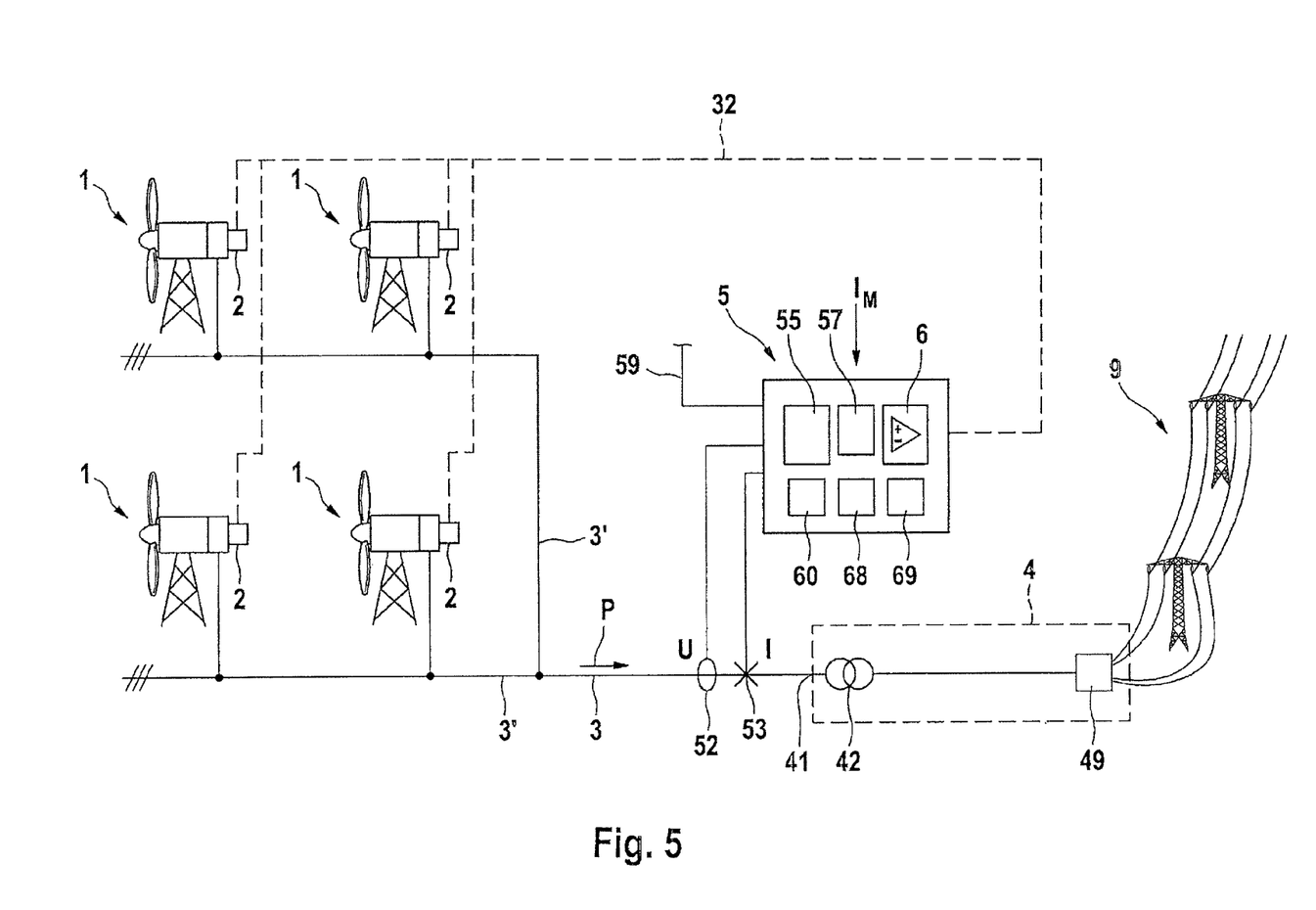
FIG. 5 shows a schematic view of a wind farm in accordance with a second exemplary embodiment of the invention.

First, reference is made to the schematic illustration of a wind farm in accordance with the invention in FIG. 5. This figure illustrates, by way of example, four wind energy installations 1, which are connected via two branches 3' of the line 3. As regards the design of the individual wind energy installations and the way in which they function, reference is made to the preceding illustrations. Differences will be explained below.

In addition to the wind energy installations 1, the wind farm has a wind farm master 5. This provides superordinate operational management for all of the wind energy installations 1 of the wind farm and monitors the connection of the wind farm to the energy transmission system 9. Default settings from the outside, such as those of the operator of the energy transmission system 9, for example, are applied to the wind farm master 5 via a connection 59 and are no longer transmitted directly to the individual wind energy installations 1. The wind farm master 5 determines desired variables for the operation of the individual wind energy installations 1 using the operating conditions and the default settings. These desired variables are communicated to the control device 2 of the individual wind energy installation 1 via a communications link 32. For this purpose, the power regulation module 55 is provided in the wind farm master 5. Furthermore, the additional power device 6 is arranged in the wind farm master 5. It corresponds in terms of its design substantially to the exemplary embodiment illustrated for the individual wind energy installation 1 in accordance with the exemplary embodiment in FIG. 1. Correspondingly, input connections for inputting the maximum current $I_M$ and measuring devices 52, 53 for current and voltage are provided on the wind farm master 5. Correspondingly, the output connection 67 of the additional power device 6 is connected to the control devices 2 of the individual wind energy installations 1 via the control lines 32.

Further optional functions will be explained with reference to the second exemplary embodiment. In addition, a limitation device 68 is provided in the wind farm master 5. It is designed in such a way that a phase angle between the current I and the system voltage $U_N$ is set, in the event of a rise in the current flowing in the line 3, to the value of the maximum current $I_M$ as a function of a selection signal input 59. This phase angle is determined corresponding to the selection signal in such a way that either primarily active power (phase angle as small as possible) or primarily reactive power (absolute value of the phase angle in the region of 90°) is fed into the energy transmission system 9.

As a result, it is possible to set, by the selection signal at the input 59, whether the production of active power or the production of reactive power is given priority. The selection signal can be applied by the operator or the operator of the energy transmission system 9 from the outside. However, provision may also be made for it to be determined using a voltage/phase angle characteristic. For this purpose, a characteristic module (not illustrated) is provided in the wind farm controller 5, which determines a reactive power requirement from the voltage and accordingly sets the selection signal.

Furthermore, an overriding voltage controller 69 can be provided in the wind farm controller 5. The measuring device 52 for the voltage is connected to its input. It is used for the purpose of identifying voltage rises at point 41 as a result of $I^2R$ losses or inductive losses owing to the higher current $I_M$ and correspondingly counteracting them. This can take place by intervention in the additional current module 6 and reduction of the emitted power, or else preferably by setting a larger reactive power component as default to the control devices 2 of the individual wind energy installations 1.

Furthermore, a compensation current module 57 can be provided in the wind farm controller 5. It is designed to compensate for the effect of the line capacitances of the lines 3 and 3' as a result of selective assignment of the reactive power to the individual wind energy installations. This compensation is aimed at the interior of the wind farm, i.e. on the wind energy installation side of the connection path 4. The module determines the reactive current required for compensation, to be precise either regulated by measurement by the measuring devices 52, 53 or controlled in accordance with the relationship iq=U/z=U×j×wC (where Z is the complex impedance of the lines 3, 3' and C is their frequency, and w represents the circuit frequency 2×π×f). This results in it also being possible for a wind energy installation 1 which is arranged in the wind farm at a great distance from the connection path 4 to feed an active power which is as high as possible into the energy transmission system 9, despite the risk of voltage rises (up to the overvoltage on the respective wind energy installation) which results from the power capacity.

Preferably, furthermore, an individual default setting device 60 is arranged on the wind farm master 5. It interacts with the additional power device 6 in such a way that individual default setting values for the maximum current to be supplied by them are communicated for the individual wind energy installations 1. As a result, certain wind energy installations could be used for increased provision of active power, while others could be used for increased provision of reactive power. It is therefore possible to adapt to the respective particular features of the individual wind energy installations, for example wind energy installations positioned at particularly favorable locations in terms of wind can be used for increased provision of active power, while the remaining wind energy installations provide increased reactive power. The utilization of the wind farm and therefore the efficiency can thus be further increased.

While various embodiments and aspects of the invention have been described above, it should be understood that they have been presented by way of example only, and not as limitations. It will be understood by those skilled in the art that various changes in form and details may be made therein without departing from the spirit and scope of the invention. Thus, the breadth and scope of the invention should not be limited by any of the above-described exemplary embodiments and aspects, but should be defined only in accordance with the following claims and their equivalents.

The invention claimed is:

1. A method for regulating a wind energy installation comprising a generator driven by a rotor, a converter connected to said generator, and a controller comprising a power regulation module that regulates power emitted via a connection path into an energy transmission system to within a limit value, wherein for the connection path a maximum current value is set, the method comprising:
   determining a current reserve value remaining between an actual current emitted via the connection path into the energy transmission system and said maximum current value; and
   determining a correction value for adjusting the limit value of the emitted power dependent on the current reserve value.

2. The method as claimed in claim 1, wherein the wind energy installation further comprises a limitation device configured to set a phase angle between emitted current and voltage of electrical system in response to a selection signal, and the method further comprising:
   setting the phase angle between the emitted current and voltage of the electrical system as a function of the selection signal in such a way that primarily active power or primarily reactive power is fed into the energy transmission system when the maximum current value is reached.

3. The method as claimed in claim 2, further comprising:
   generating the selection signal using a voltage or phase angle characteristic.

4. The method as claimed in claim 2, wherein the selection signal is impressed externally by an operator of the energy transmission system.

5. The method as claimed in claim 2, 3 or 4, further comprising:
   calculating amount of a reactive power or active power to be fed secondarily using the primarily fed active or reactive power by using a predeterminable characteristic.

6. The method as claimed in claim 5, wherein the characteristic is determined by an elliptical function with a standardized representation $1=P^2:a^2+Q^2:b^2$.

7. The method as claimed in claim 1, 2, 3 or 4, further comprising:
   determining and applying a limitation signal to the wind energy installation to limit the current to be emitted by the wind energy installation.

8. A method for regulating a wind farm with a wind farm master and at least one wind energy installation, wherein a wind farm master carries out the power regulation method as claimed in claim 1, 2, 3 or 4.

9. The method as claimed in claim 8, wherein the wind farm comprises at least two wind energy installations, and a different correction value for power correction is determined for each of the individual wind energy installations.

10. The method as claimed in claim 9, wherein each of the different correction values is determined in relation to a maximum active current which can be fed.

11. A wind energy installation configured for carrying out the method as claimed in claim 1, 2, 3 or 4.

12. A wind farm configured for carrying out the method as claimed in claim 8.

13. The method as claimed in claim 8, wherein the power regulation utilizes a complex impedance value of at least one of connecting lines to the wind energy installation.

14. A wind energy installation comprising:
a generator driven by a rotor;
a converter connected to said generator; and
a controller comprising a power regulation module that is configured to regulate power emitted via a connection path configured for a maximum current value into an energy transmission system to within a limit value,
wherein the power regulation module is configured to determine a current reserve value remaining between an actual current in the connection path emitted into the energy transmission system and said maximum current value, and to determine a correction value for adjusting the limit value of the emitted power dependent on the current reserve value.

15. A wind farm, comprising:
a wind farm master; and
at least one wind energy installation comprising a generator driven by a rotor, a converter connected to said generator, and a controller,
wherein the wind farm master comprises a power regulation module for regulating power emitted via a connection path configured for a maximum current value into an energy transmission system to within a limit value,
the power regulation module being configured to determine a current reserve value remaining between an actual current in the connection path emitted into the energy transmission system and said maximum current value, and to determine a correction value for adjusting the limit value of the emitted power dependent on the current reserve value.

16. The wind farm as claimed in claim 15, wherein the wind farm has at least two wind energy installations, and the power regulation module is configured to determine a different correction value for correction of power for each of the individual wind installations.

17. The wind farm as claimed in claim 16, wherein the different correction value for each of the individual wind installations is determined in relation to maximum active current which can be fed.

* * * * *

UNITED STATES PATENT AND TRADEMARK OFFICE
CERTIFICATE OF CORRECTION

PATENT NO. : 7,989,974 B2
APPLICATION NO. : 11/995309
DATED : August 2, 2011
INVENTOR(S) : Jens Fortmann et al.

Page 1 of 1

It is certified that error appears in the above-identified patent and that said Letters Patent is hereby corrected as shown below:

On the front page, line (86) PCT No.:

Please replace "PCT/JP2006/006821" with -- PCT/EP2006/006821--

In the Specification:

At column 1, line number 25, after "to generate electrical energy by" please delete "means of"

At column 3, line number 49, after "having the features" please delete "of"

At column 7, line number 52, place replace "iq=U/z=U×j×wC" with

-- iq = U/Z = U × j × wC --

Signed and Sealed this
Eighteenth Day of October, 2011

David J. Kappos
*Director of the United States Patent and Trademark Office*